(12) United States Patent
Esteve Tintó et al.

(10) Patent No.: US 8,633,605 B2
(45) Date of Patent: Jan. 21, 2014

(54) MAGNETIC FLUX POWER GENERATION BASED ON OSCILATING MOVEMENT

(75) Inventors: Jaume Esteve Tintó, Barcelona (ES); María Cruz Acero Leal, Barcelona (ES); Nuria Fondevilla Sala, Barcelona (ES); Alejandro Pérez Rodríguez, Barcelona (ES); Christophe Serre, Barcelona (ES)

(73) Assignees: Universidad de Barcelona, Barcelona (ES); Consejo Superior de Investigaciones Cientificas, Madrid (ES)

( * ) Notice: Subject to any disclaimer, the term of this patent is extended or adjusted under 35 U.S.C. 154(b) by 99 days.

(21) Appl. No.: 13/377,061

(22) PCT Filed: Jun. 15, 2010

(86) PCT No.: PCT/ES2010/070400
§ 371 (c)(1),
(2), (4) Date: Jan. 18, 2012

(87) PCT Pub. No.: WO2010/146213
PCT Pub. Date: Dec. 23, 2010

(65) Prior Publication Data
US 2012/0104765 A1    May 3, 2012

(30) Foreign Application Priority Data

Jun. 16, 2009  (ES) .................................. 200930320

(51) Int. Cl.
*F02B 63/04*   (2006.01)

(52) U.S. Cl.
USPC ............................................. 290/1 A; 310/15

(58) Field of Classification Search
USPC ........................................ 290/1 A; 310/15, 36
See application file for complete search history.

(56) References Cited

U.S. PATENT DOCUMENTS

| | | | |
|---|---|---|---|
| 4,140,932 A | 2/1979 | Wohlert | |
| 7,439,640 B2* | 10/2008 | Takeuchi | 310/12.22 |
| 7,989,971 B2* | 8/2011 | Lemieux | 290/1 R |
| 2004/0104625 A1* | 6/2004 | Wakuda et al. | 310/15 |
| 2007/0052302 A1* | 3/2007 | Cheung et al. | 310/12 |
| 2007/0159011 A1* | 7/2007 | Terzian et al. | 310/15 |
| 2008/0084072 A1* | 4/2008 | Terzian et al. | 290/1 R |
| 2008/0174187 A1* | 7/2008 | Erixon et al. | 310/15 |
| 2012/0049988 A1* | 3/2012 | Johnson | 335/256 |

FOREIGN PATENT DOCUMENTS

WO    WO-2006078084 A1   7/2006

* cited by examiner

*Primary Examiner* — Vanessa Girardi
(74) *Attorney, Agent, or Firm* — Blank Rome LLP

(57) ABSTRACT

This invention describes a device for the generation of electric energy from small movements which comprises: a magnet with the shape of a solid of revolution which comprises at least a couple of poles (N, S) placed around an axis of revolution; a tube whose transversal section is complementary to the shape of the magnet, and which comprises a winding rolled transversally around it, with the magnet placed in the interior of the tube so that an inclination of the tube causes the magnet to roll, traveling along the interior of the tube and inducing tension on the winding.

16 Claims, 4 Drawing Sheets

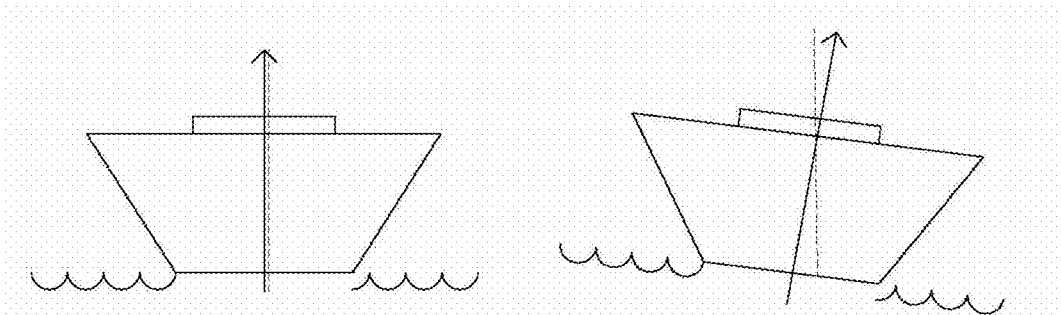
FIG. 1A  FIG. 1B
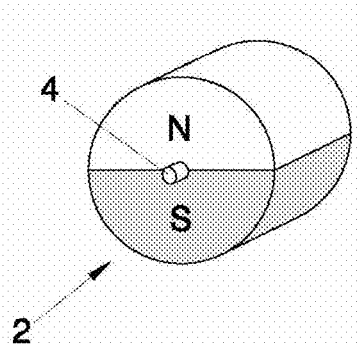 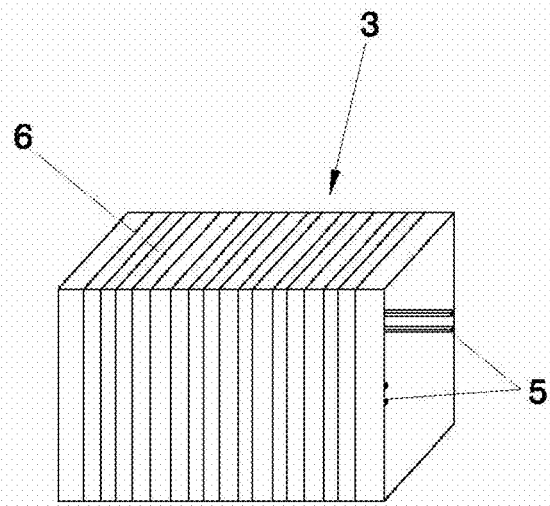
FIG. 2A  FIG. 2B

MAGNETIC FLUX POWER GENERATION BASED ON OSCILATING MOVEMENT

This application is a national phase of International Application No. PCT/ES2010/070400, filed Jun. 15, 2010, which claims the benefit of Spanish Application No. P 200930320, filed Jun. 16, 2009.

OBJECT OF THE INVENTION

The object of this invention is to take advantage of low-frequency oscillation or swinging movements induced by mechanical energy present in the environment for the generation of electricity and, more specifically, movement created by waves, wind or by movement of the human body.

BACKGROUND OF THE INVENTION

In the last few years there has been a large development in microelectronic technology, which has led to the emergence of sensor networks and various mobile applications with wireless connections. The creation of these autonomous systems has sparked a current growing interest internationally in the development of generators providing them with energy. Power to this kind of systems is normally provided from batteries, which present limitations associated with the need of recharge as well as cost. In addition, the batteries contain highly polluting elements and require recharge. Batteries also determine in many cases the final volume of the systems, constituting a limitation to the procurement of systems of increasingly reduced dimensions and which must be autonomous in operation. The need for alternative power sources other than batteries has provided for the emergence of a large number of research projects based on micro/nano systems technology for the energy generation through alternative sources of higher duration (hydrogen combustion micro batteries) or environment sources not needing recharge (light, vibration, thermal gradient). One of the most interesting options consists of taking advantage of mechanical energy present in the environment in the shape of vibrations and/or movement, due to obtaining the necessary power density to feed a micro system without depending on the level of illumination.

To make the conversion from vibration energy to useful electrical energy, different transduction principles may be used, such as: piezoelectric, electrostatic and electromagnetic. Among these different types of generators, the electromagnetic are the ones allowing for a high electromechanical connection through the use of relatively easy designs leading to high power densities.

In the case of magnetic generators with permanent magnets, the generated power density inducing voltage in a coil is fully scalable. The generators may be classified in three groups:

a) Rotational Generators

Imitate the operating method of macro-scale motors and generators. They depend on a constant source of mechanical rotational energy (e.g. fluid propelled turbine, motor . . . ). They are devices that, if provided with small dimensions, generally operate at high rotational speeds and therefore have high electrical frequencies, which enable them to match or even exceed the power density of their macroscopic counterparts.

b) Vibration Generators

They are attractive because they are able to create energy without the need of a driving force (motor, turbine). They operate at low frequencies and low power densities. Their operation is based on a magnet and a coil moving relative to the magnet due to the influence of external vibration. Maximum power generated occurs when the external vibration coincides with the device's resonance frequency.

There are different research groups on the field of inertial electromagnetic generator development using macro-components. These devices are based on the implementation of a "velocity damped resonator" and their typical volumes are of a few cm3 and may generate power ranging from hundreds of μW to mWs. In some cases the feasibility of these devices has been proved for the autonomous operation in simple systems (equipped with a sensor device and a transducer (transmitter-receptor) of data through the air).

c) Hybrid Generators

They are vibration generators that may generate energy thanks to rotational machines. Their function is to widen the range of operational frequencies in vibration generators.

The developed devices reported in literature are normally based on the implementation of designs including an eccentric magnetic rotor and a fixed coil, which enables rotation of the magnet from low frequency movements. Therefore they are adequate for taking advantage of energy associated with frequencies in the range of hertz, and a large amplitude such as those induced by waves. The designs reported in the literature enable reaching, at this time, power densities in the $10^{-6}$ $W/cm^3$ to $10^{-3}$ $W/cm^3$ range.

DESCRIPTION OF THE INVENTION

This invention consists of a device using small movements at low frequencies, such as wind movement, waves or the human body to generate energy. The device essentially comprises a coil featuring a magnet in its interior, obtained from a body of revolution, so due to the inclination of the coil, induced by an oscillating or swinging movement, the magnet rotates inside the coil producing a change of the magnetic flow and voltage at the coil's ends.

This design presents as advantages its extreme simplicity and low price, since the elements that constitute it are obtained employing well-established technologies and the materials have a low acquisition cost. Thus, it is possible to integrate the proposed device in constructive elements, such as of a boat, enabling to use the mechanical energy in the environment without that representing a significant use of space.

According to the invention, therefore, a device to generate electric energy from small movements is described, comprising the following elements:

a) A magnet with the shape of a solid of revolution comprising at least two poles (N, S) placed around its axis of revolution.

b) A tube, whose transversal section is complimentary to the shape of the magnet and that comprises a winding rolled transversally around it. The coil is placed inside this tube, so that when it is tilted the magnet begins to roll, along the interior of the tube, which at the same time induces tension on the winding due to the alternating passing of both north and south poles in front of the turns of winding.

The tube's length must be designed according to the expected frequency of oscillation in order to avoid the oscillation to change direction before the magnet has passed from one end of the tube to the other, thus maximizing the energy obtained during each oscillation. More specifically, the higher the frequency the lesser the length of the tube and vice versa. As for the transversal section, it must be adequate for the magnet to rotate inside of it around its axis of revolution. It is further understood that the lesser the space between magnet and the tube, the greater the energy that is generated, always avoiding frictions that cause the magnet to lose mechanical energy.

In a particular embodiment of the invention, the magnet further comprises pivoting points protruding laterally on its surface through points belonging to its axis of revolution. Meanwhile, the tube comprises opposing longitudinal rails designed to accommodate the magnet's pivoting points. Thus, when a tilting of the tube is produced, the magnet rolls supported on these pivoting points. This way, a minimization of friction of the magnet over the tube is attained, as well as increasing the magnet's rotation speed, since the pivoting points are small in size, a higher rotation speed may be attained at the expense of a lower linear speed, and therefore a higher induced tension. In addition, the pivoting points force the rotation of the magnet in a certain direction, thus guaranteeing optimal magnetization relative to the prism's coil. In order to prevent sliding of the axis as far as possible, the pivoting points will have radial projections that fit into notches made on the rails.

The winding is rolled transversally around the tube, so that the variation in magnetic flow caused by rotation of the magnet's poles causes the creation of an electromotive force induced at its ends. In a particular embodiment of the invention, it consists of a single winding covering the entire length of the tube. However, in order for the electromotive force to emerge even in the event that the magnet slips as it rolls inside the coil, in another particular embodiment, the winding is made up by a set of individual coils rolled alternatively with opposing directions.

Additionally, in another preferred embodiment, the device is designed so that the length of each coil is equal to the magnet's revolution diameter, so that it is always entering or leaving a coil, and therefore, the magnetic flow varies continuously.

A preferred embodiment of the invention is directed towards a spherical magnet that travels on the interior of a tube with a circular section. In this case, the poles would have a semi-spherical, quarter-spherical shape, etc., depending on their number. Another preferred embodiment describes a cylindrical magnet traveling along the interior of a tube with a parallelepiped section, in which case the poles will have the shape of a cylindrical sector. It is understood that other forms of the device would be possible, as long as the magnet was obtained as a solid of revolution and the tube had the corresponding complementary shape, and that could help to adjust the design to other particular scenarios. For example, a device with a magnet in the shape of an ellipse of revolution and a tube with an elliptical section could help to improve the support stability of the pivoting points on the tube's rails.

In a more preferred embodiment of the object of the invention, the magnet travels in the interior of the tube sliding, to that end the magnet is assembled over a ring specially designed to prevent lateral rotation; this way the magnet is prevented from spontaneously adopting an orientation tending to minimize its energy, consequently leading to a nil position of varying magnetic flow.

Finally, this invention is also directed towards a module of generation comprising a plurality of devices such as those previously described.

BRIEF DESCRIPTION OF THE DRAWINGS

FIGS. 1a and 1b show the oscillating movements that are produced on a boat in a simple way.

FIGS. 2a, 2b and 2c show, respectively, a cylindrical magnet, a tube with a parallelepiped section and a device with a cylindrical magnet and a tube with a parallelepiped already assembled.

PREFERRED EMBODIMENT OF THE INVENTION

FIG. 1 of this example represents the oscillations that occur on a boat. Note that the frequency of a boat's oscillation depends on the size of the boat, with a fishing boat of small dimensions oscillating at a higher frequency than a large-sized boat, such as an oil tanker. This must be taken into account during the design of the invention's device, designing shorter tubes for higher operation frequencies.

In the following embodiments two devices (1, 1') adequate for the procurement of electric energy from the movement produced by waves on small boats (such as fishing boats or yachts) are described, using NdFeB magnets (2, 2') and Cu winding (6, 6') whose turns have a 200 μm width.

Figure 2C:
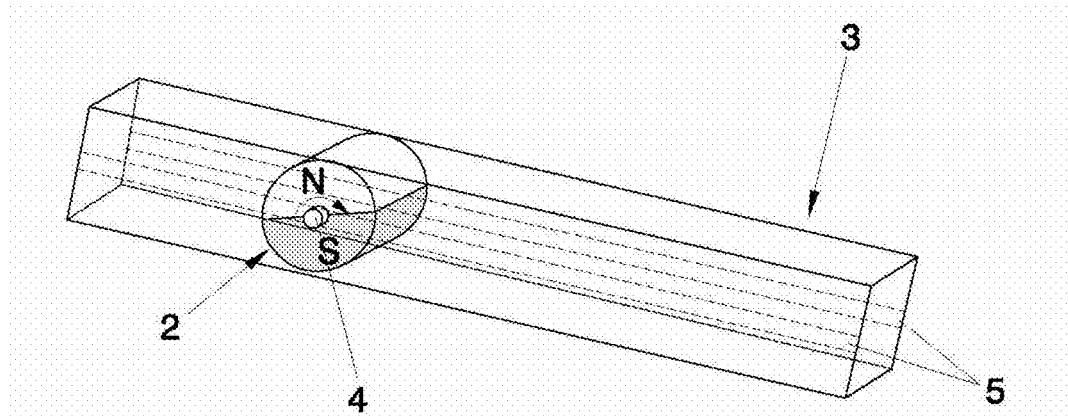

The first embodiment is represented on FIGS. 2a, 2b and 2c. FIG. 2a shows a cylindrical magnet (2), which in this example comprises only a couple of poles (N, S), and which may rotate around pivoting points (4) which coincide with the ends of the axis of revolution of the cylindrical magnet (2). FIG. 2b, on the other hand, represents the corresponding tube with a parallelepiped section (3), being able to appreciate the rails (5) placed in lines longitudinal to the center of opposing sides, as well as the exterior transversal winding (6). The magnet's (2) contour should be adjusted as much as possible within the tube of parallelepiped section (3), since that way the flow variation induced during its rotation will be maximized, although always avoiding the creation of friction that could slow that rotation movement.

Figures 3A, 3B:
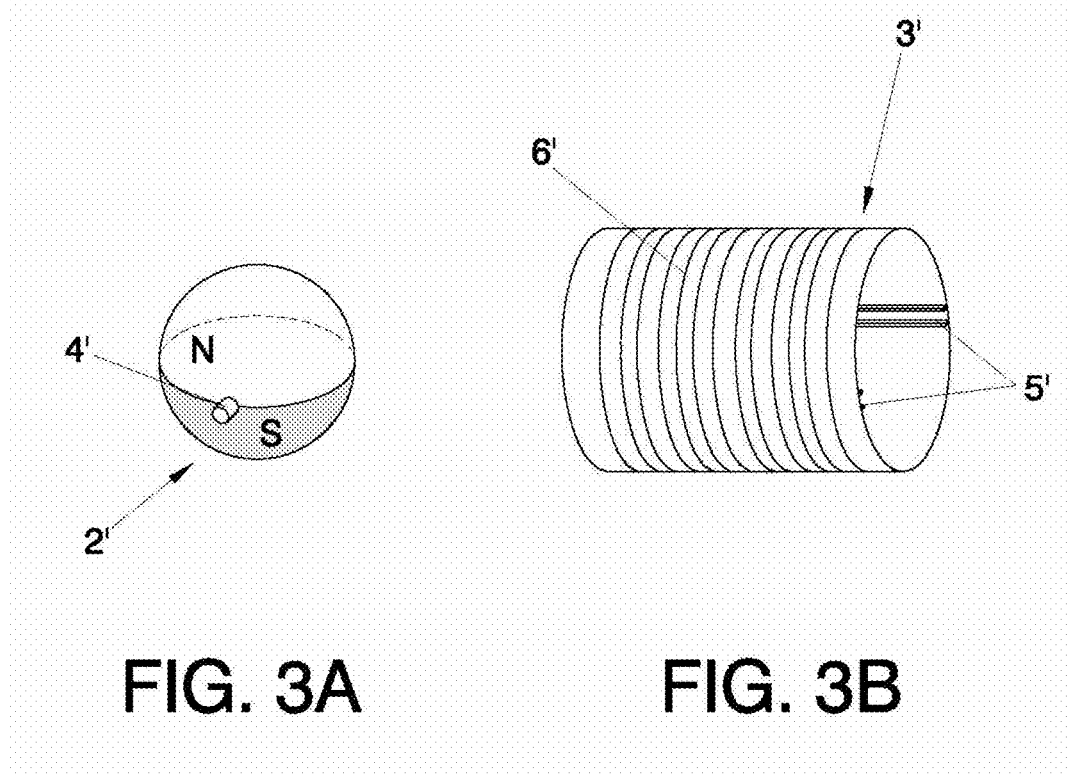
FIGS. 3a, 3b and 3c show, respectively, a spherical magnet, a tube with a circular section and a device with a spherical magnet and a tube with circular section already assembled.
Figure 3C:
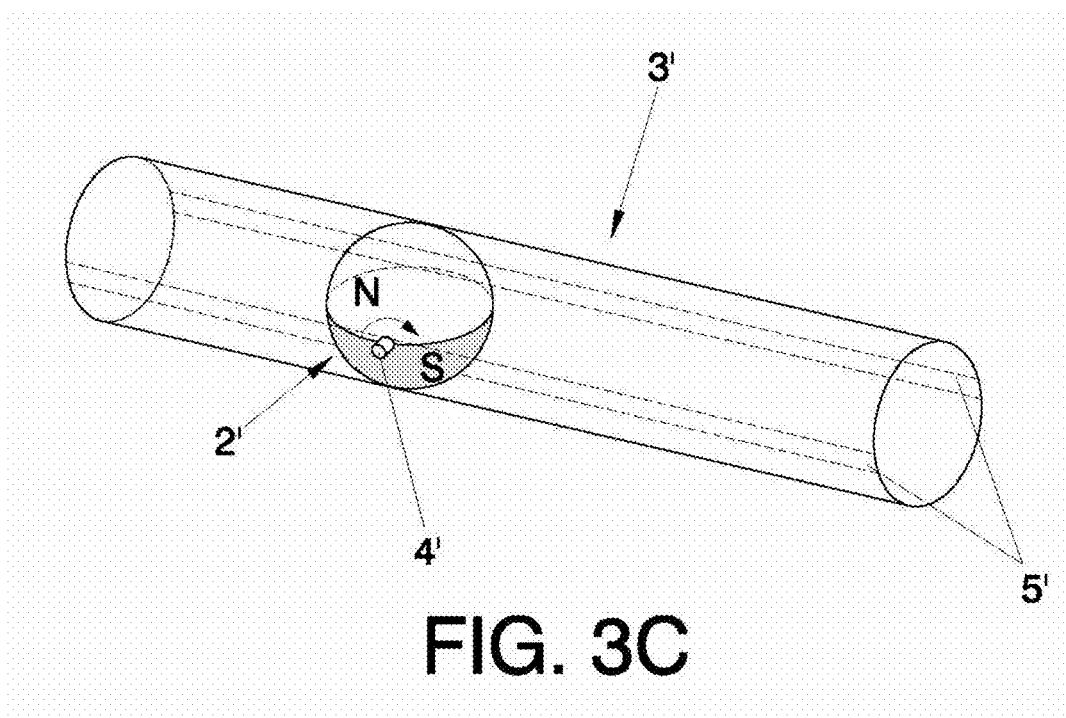
Figure 3D:
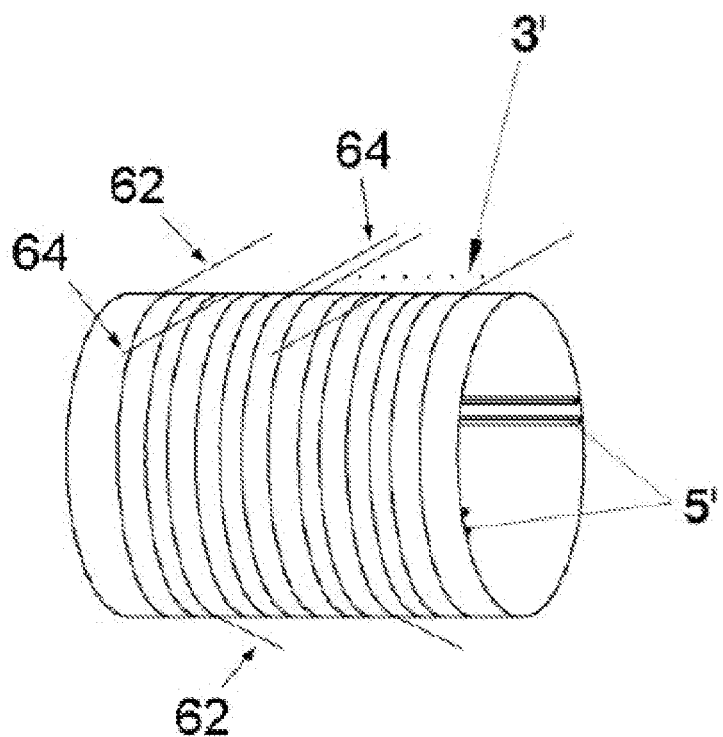
FIG. 3d shows a tube with individual coils alternately wound in opposing directions.

FIG. 2c shows the device (1) already assembled and in operation during the boat's oscillation. It shows how the parallelepiped shape tube (3) has tilted to the right, and the cylindrical magnet (2) rotates in its interior with the pivoting points (4) supported over the rails (5). Due to clarity of the drawing, the winding (6) has not been represented in this figure. It shows how the rotation of the cylindrical magnet (2) causes the alternative passage of the north (N) and south (S) poles in front of each turn of the winding (6), generating an electromotive force induced at the ends of the winding (6). Described below is the device (1') of the second embodiment, making reference to FIGS. 3a, 3b, and 3c, where FIGS. 3a and 3b show respectively the spherical magnet (2') and the tube with a circular section (3'). In this case, the poles (N, S) have a hemispherical shape, with pivoting points (4') being placed at the ends of an imaginary axis of revolution passing through the center of the sphere. The longitudinal rails (5') may also be appreciated, placed on opposing generatrixes in the interior of the tube with circular section (3'). FIG 3c shows the spherical magnet (2') device (1') already assembled. In FIG. 3d, the winding is formed by a number of individual coils (62 and 64) wound alternately in opposing directions. As detailed above, various winding embodiments are contemplated.

In a third embodiment, the magnet (2, 2') is assembled over a ring in a way that the pivots (4, 4') are placed over it to limit the magnet's (2, 2') movement, avoiding lateral rotations, otherwise, the magnet (2, 2') would spontaneously embrace an orientation tending to minimize its energy, resulting in a nil magnetic flow variation position. In this third embodiment, the magnet (2, 2') is spherical and made of neodymium with a 1 cm radius and a 10 magnet/axis relation, while the tube (3, 3') comprises a winding (6, 6') with 8 coils. Each coils features 3,000 turns made of copper wire with a 100 µm diameter. The output tensions generated by both prototypes are measured in an open circuit when the magnet (2, 2') crosses the 8 coils once, for different tilting angles of the device (1), but maintaining the device (1) on a fixed angle during each measurement. For this configuration in which the magnet (2, 2') travels sliding instead of rolling in the interior of the tube (3, 3') a higher number of tension peaks are generated, with a higher output tension.

These configurations in which the magnet (2, 2') rolls generate a higher number of tension peaks and with a higher output tension than when it slides. With the 12° tilt angle, as in the figure, an average output power of 1.2 mW/cm$^3$ has been obtained, as opposed to the 0.3 mW/cm$^3$ obtained with the sliding magnet (2, 2').

Although at this point this design is adapted to the electricity generating needs in small boats (such as fishing or recreational boats) the underlining idea of the invention is applicable to a wider set of situations, also including systems that must operate autonomously during prolonged periods of time, such as buoys and markers for maritime applications, or systems for the automatic control of autonomous equipment in maritime infrastructures (ports, fishing exploitations . . . ). As for land applications, the system is also adjustable, through an adequate design, to generators using the wind movement of mobile pieces as a source of energy. Generators using movement produced by a human or animal body or machinery as a source of movement, may also be considered.

The invention claimed is:

1. An electricity generation device comprising:
   a tube, characterized by a length and a cross-sectional profile, the tube having an inner and an outer surface, wherein,
   the inner surface further defines at least two rails which extend the length of the tube, and
   the outer surface is encircled by a winding;
   a magnet having a shape which defines an axis of rotation permitting rotation of the magnet within the tube, wherein the magnet further comprises at least two poles delineated by the axis of rotation; and
   two pivoting points located collinearly with the axis of rotation,
   wherein the magnet is placed within the tube and the two pivoting points are aligned with the two rails, such that tilting of the tube results in the magnet rotating along the length of the tube.

2. The device according to claim 1, wherein the winding comprises a single coil.

3. The device according to claim 1, wherein the pivoting points comprise projections that fit into the rails.

4. The device according to claim 1, wherein the magnet has a cylindrical shape and the cross-sectional profile is a section of a parallelepiped.

5. The device according to claim 1, wherein the magnet has a spherical shape and the cross-sectional profile is circular.

6. An electricity generation module which comprises a plurality of devices according to claim 1.

7. The device according to claim 1 wherein the winding is formed by a number of individual coils wound alternately in opposing directions.

8. The device according to claim 7, wherein the length of each individual coil equals the distance traveled by the magnet during one revolution.

9. The device according to claim 1, further comprising a ring located around the magnet and on which the pivoting points are located.

10. The device according to claim 9, wherein the winding comprises a single coil.

11. The device according to claim 1, wherein the pivoting points comprise projections that fit into the rails.

12. The device according to claim 1, wherein the magnet has a cylindrical shape and the cross-sectional profile is a section of a parallelepiped.

13. The device according to claim 1, wherein the magnet has a spherical shape and the cross-sectional profile is circular.

14. An electricity generation module which comprises a plurality of devices according to claim 9.

15. The device according to claim 9, wherein the winding is formed by a number of individual coils wound alternately in opposing directions.

16. The device according to claim 7, wherein the length of each individual coil equals the distance traveled by the magnet during one revolution.

\* \* \* \* \*